(12) United States Patent
O'Keeffe et al.

(10) Patent No.: US 6,763,348 B2
(45) Date of Patent: Jul. 13, 2004

(54) METHOD AND APPARATUS FOR SEARCHING DATABASES EMPLOYING A TRIE SEARCH STRUCTURE

(75) Inventors: Daniel M O'Keeffe, Ballyhooly (IE); Mark A Hughes, Dublin (IE); Kevin Loughran, Castleblayney (IE); John Hickey, Ratoath (IE); Paul O'Keeffe, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 287 days.

(21) Appl. No.: 09/731,855

(22) Filed: Dec. 8, 2000

(65) Prior Publication Data

US 2002/0052869 A1 May 2, 2002

(30) Foreign Application Priority Data

Oct. 27, 2000 (GB) .............................................. 0026264

(51) Int. Cl.[7] .............................................. G06F 17/30
(52) U.S. Cl. .............................................. 707/3; 707/10
(58) Field of Search ................................ 707/1, 2, 3, 6, 707/100, 10, 102; 370/352, 353, 354, 355, 356, 357, 392, 389; 162/111

(56) References Cited

U.S. PATENT DOCUMENTS

| | | | | |
|---|---|---|---|---|
| 5,519,858 A | * | 5/1996 | Walton et al. | 707/10 |
| 5,995,971 A | * | 11/1999 | Douceur et al. | 707/102 |
| 6,018,524 A | * | 1/2000 | Turner et al. | 370/392 |
| 6,041,053 A | * | 3/2000 | Douceur et al. | 370/389 |
| 6,200,418 B1 | * | 3/2001 | Oriaran et al. | 162/111 |
| 6,212,184 B1 | * | 4/2001 | Venkatachary et al. | 370/392 |

FOREIGN PATENT DOCUMENTS

WO WO 0077984 A1 12/2000

* cited by examiner

*Primary Examiner*—Diane D. Mizrahi
(74) *Attorney, Agent, or Firm*—Nixon & Vanderhye P.C.

(57) ABSTRACT

A trie searching technique employs entries each including a pointer to the next block in the search and a status indication and also including start and end indexes which define a selected section of the trie key identifying an entry within the block identified by the pointer. Thereby the program for selection of the search key is defined by the trie entries themselves, enabling a general variety of search selections and jumps to avoid any unnecessary parts of the trie search key.

21 Claims, 4 Drawing Sheets

METHOD AND APPARATUS FOR SEARCHING DATABASES EMPLOYING A TRIE SEARCH STRUCTURE

FIELD OF THE INVENTION

This invention relates to searching in databases in order to find a match or partial match of address data in the database so as to retrieve associated data. The invention is primarily though not necessarily exclusively concerned with look-up databases employed in network units for use in a data communication system employing addressed frames or data packets.

BACKGROUND OF THE INVENTION

It is necessary in data communication systems employing addressed frames or packets to perform look-ups in order to retrieve, directly or indirectly, for example by recourse to pointers, associated data such as forwarding data. A typical example is in a switch or router wherein while packets are temporarily stored, a look-up in an address database is performed in order to retrieve the forwarding data which will determine the port or ports from which any given packet should be forwarded from the switch or router. Look-up databases and techniques for operating them are very well established in the art.

In view of the potentially very great number of different destinations, whether expressed in media access control terms or network address terms, to which packets might have to be forwarded by a switch or router. A variety of techniques have been developed for reducing the amount of memory space which has to be employed in practice. Although directly searchable memories, usually called content addressable memories, are known, such memories are complex and expensive and are normally only used for relatively small capacity caches. Other techniques for reducing the amount of memory space required in practice include hashing, wherein addressed data is reduced (typically from 48 bits to 16 bits) by an appropriate hashing algorithm and the address data is stored in hashed form.

Such a scheme and other schemes such as the ones described below, typically require a final comparison of the full address associated with the hashed entry with the address of the packet requiring look-up in order to ensure that the correct entry is found.

An important technique for searching in look-up databases is a technique which employs a multi-way tree structure or trie search structure. Such structures are known in the art and are, for example, described in published European application EP-0551243-A (Digital Equipment Corporation), U.S. Pat. No. 6,041,053 (Douceur), an international published application WO96/00945 (IBM) and elsewhere. Trie searching has in common the establishment of a structure wherein a key is formed from all or part of the address data and is read in slices. At each stage of the search there is an entry which contains a pointer which points to a block of entries but does not distinguish between the entries in that block. Such a block is accessed at the next stage or slice of the search and that part of the key which is employed in that stare obtains the particular entry within the block. Each entry may include a status indication which indicates whether the search is finished or not or is successful or not.

Generally speaking, up to the present time a trie search facility has accommodated only a single search strategy, in which the order and sizes of the sections used in the search key are predetermined by the search engine externally of the trie structure. The aforementioned U.S. Pat. No. 6,041,053 employs what the patent calls 'wild cards' to enable different search paths to a common node. The aforementioned European application EP-0551243-A describes a structure in which different search strategies may be determined in advance, allowing different root nodes to provide several traversal paths, each able to accommodate a different size and address format from among, the possible network addresses that can be input to the searching engine. Each database specifier will include information on the root node to be used for a particular network address.

However, such proposals are not adequate to cope conveniently with a possible change in search strategies. It is normal and convenient to optimise a trie search for a particular application or search strategy. For example, in a given switch a trie search mechanism may only be required for a layer 3 (network address) look-up. Accordingly, the trie key chosen for a trie search would be selected to be the most efficient for layer 3 look-ups. If a new 'application' or feature would now to require the use of the search engine, the key may not be optimised and in particular may slow down the search since the search would be using parts of the key that are relevant to the 'layer 3' application but not to the new application. As a particular example, a current search strategy may require a key composed of the IPDA (internet protocol or network destination address), an identification of the relevant virtual local area network (VLANID) and the IPSA (internet protocol or network source address). However, if the relevant device, for example a router, is employed for server load balancing, wherein a multiplicity of servers are in a server farm sharing the same virtual IPDA, a search made for the purpose of server load balancing, to obtain the forwarding, data required to direct a packet to the given server, may only require a search to be made for the IPSA, the network source address. However, with the fixed key the searching engine has to perform the trie search through the stages or sections of the IPDA and VLANID before it reaches the sections pertaining to the IPSA.

There exists therefore a need for a versatile and convenient manner of altering the search strategy in a trie search stricture, preferably in a manner which does not require any increase in memory, additional hardware or external programming.

SUMMARY OF THE INVENTION

The present invention is based on a novel data structure for the trie search which enables a selection of the next statue in a trie search to be determined by a given entry in the trie structure. In a preferred form, the invention contemplates the provision of at least an additional field for each entry in the database. This extra field, termed herein a 'search code' indicates to the search engine which section of a key should be used for the next search access. The search code is intended to indicate or delimit a section in the key that should be used to perform the next stare of the trie search. Accordingly, the trie sections actually employed in the search are selected from a basic key by means of the entries in the database. In effect the selection of the trie key may be programmed into the database.

Further features of the invention will become apparent from the following description and the accompanying drawings.

DETAILED DESCRIPTION

Figure 1:
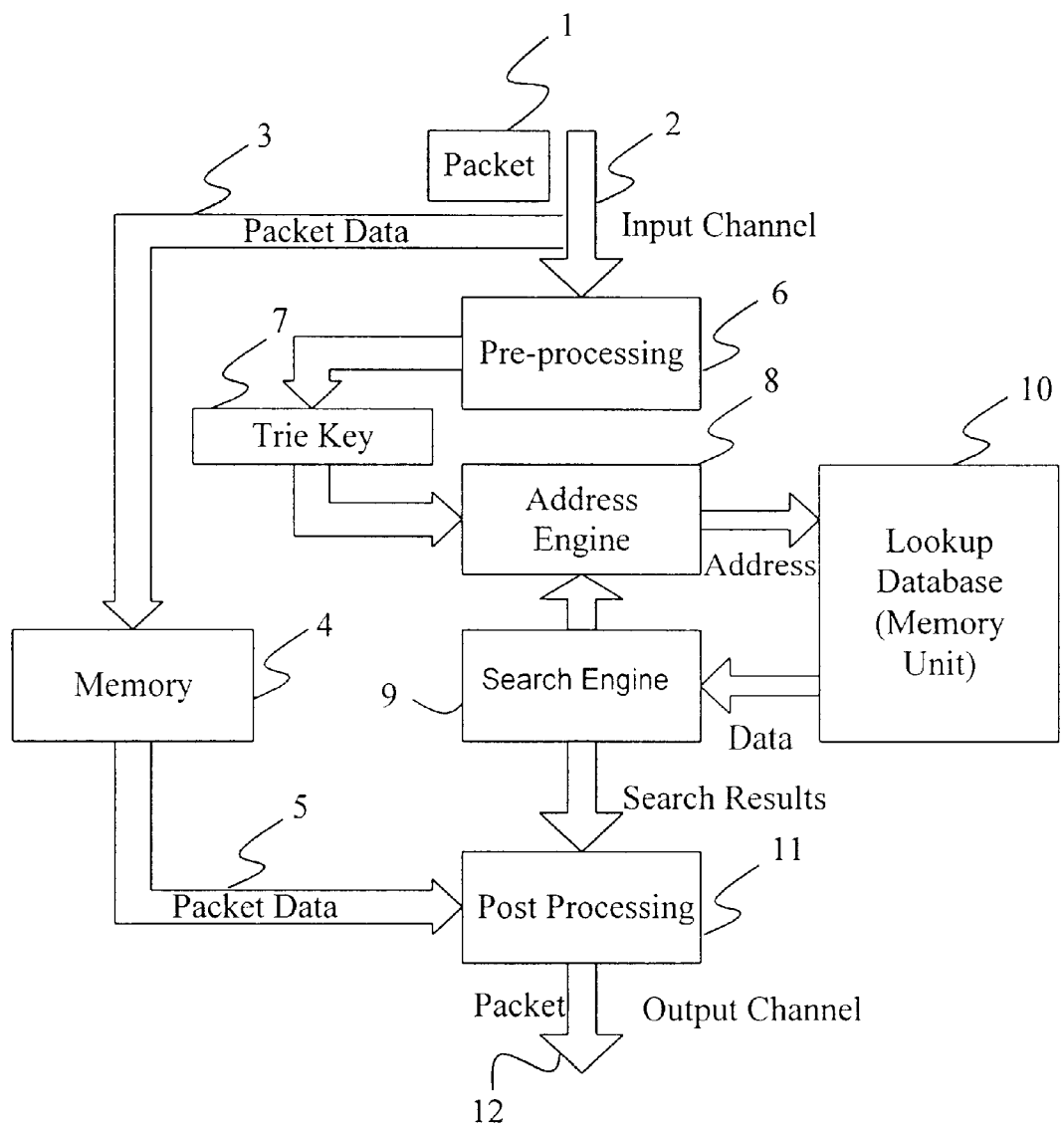
FIG. 1 is a schematic diagram illustrating the functional features of a searching process or apparatus according to the invention.

FIG. 1 illustrates in a schematic way a trie search conducted according to the invention. For the most part, the structural elements which can be employed to perform a trie search according, to the invention are common to the prior art and it is generally intended that the trie search may be performed in a manner generally similar to trie searches according to the state of the art. All the features in FIG. 1 are known in themselves and therefore need not individually be described in detail.

In the scheme shown in FIG. 1, packets such as a packet 1 are received by way of an input channel 2. Packet data from the packets is stored in a memory 4. Data is extracted from a packet, particularly the header of the packet by means of a preprocessing stage 6 in order to obtain a trie key 7. The trie key typically consists of the 'layer 3' (network layer) address information in addition to some additional fields, such as for example the 'VLANID' identification or other fields taken from the packet. However, the full trie key 7 which is extracted from the packet could consist of the whole packet or frame if desired.

The trie key is made available to an address engine 8 which is controlled by a search engine 9 and provides address access to the look-up database 10. The organisation of this database will be described as reference to FIG. 2. Data retrieved from the look-up database is provided by the search engine to a post processing stage 11 which associates the search results with the data of the relevant packet so that the packet is directed to an output channel 12 thence it may be directed, for example, to the ports or ports identified by the forwarding data which may form part of the search results.

Figure 4:
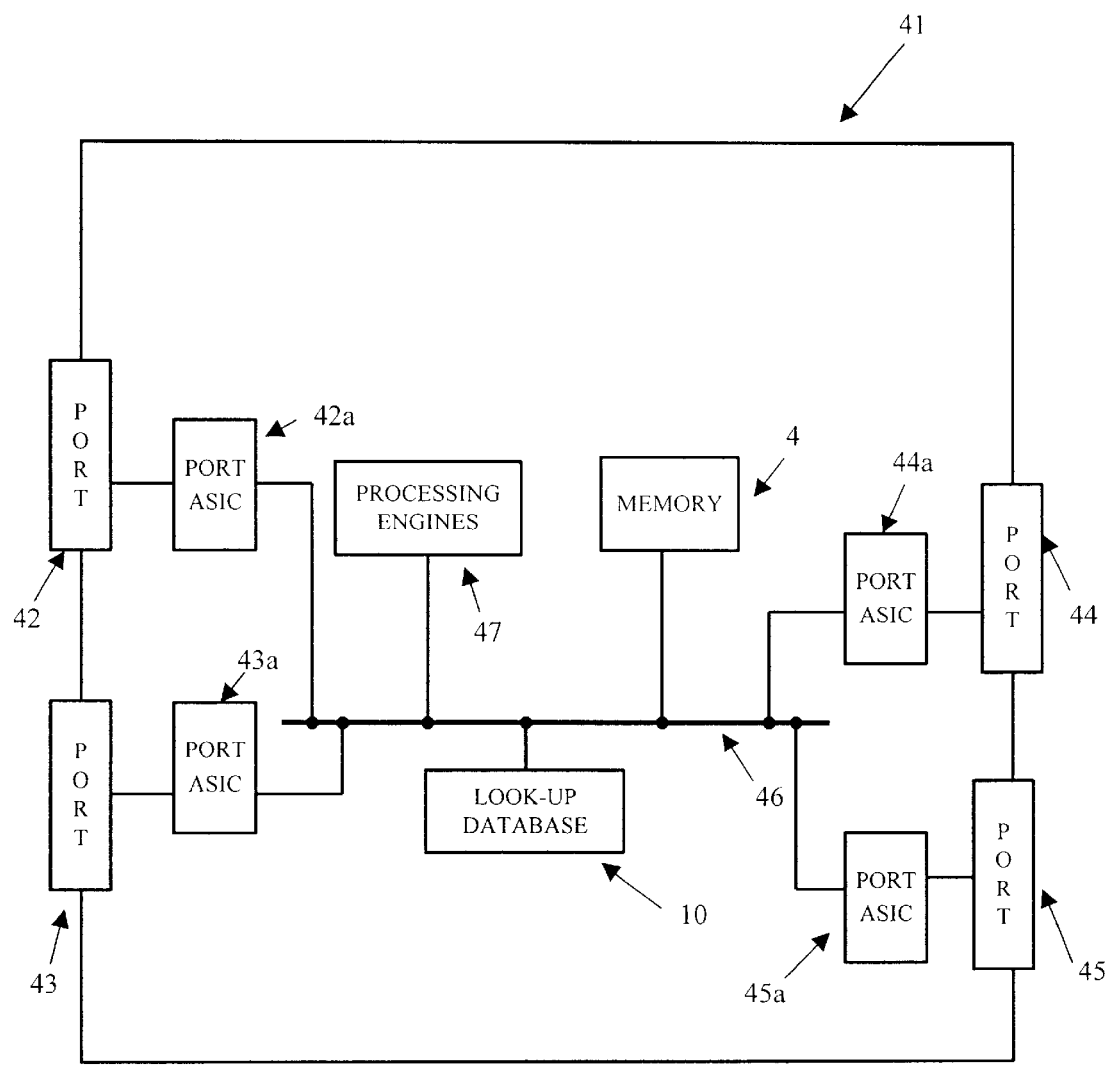
FIG. 4 is a schematic illustration of a multiport unit within which the present invention may be embodied.

FIG. 4 illustrates merely by way of example a typical structure within which a searching scheme such as shown in FIG. 1 may be incorporated. FIG. 4 represents a typical switch or router 41 having a multiplicity of ports, represented in FIG. 4 by the ports 42 to 45. Each port has an associated port asic 42a, 43a etc. which includes the media access control functions associated with the port and may include buffer memories in accordance with known practice. The port ASICs 42a etc. are shown separately in FIG. 4 but in practice may form part of a single ASIC which includes the hardware required for the processing engines 47 part of the look-up database 10. The memory 4 is typically 'off-chip' memory, as may be at least part of the look-up database 10. Bus 46 in FIG. 4 is intended to represent the buses required for the conveyance of control and management signals as well as packet data across the switch. Again, FIG. 4 represents a structure which is generally known in the art and it is not intended to limit the invention to any particular form of architecture. Processing engines 47 in FIG. 4 will normally include the pre-processing and post processing stages 6 and 11 of FIG. 1 as well as the address and search engines 8 and 9.

Figure 2:
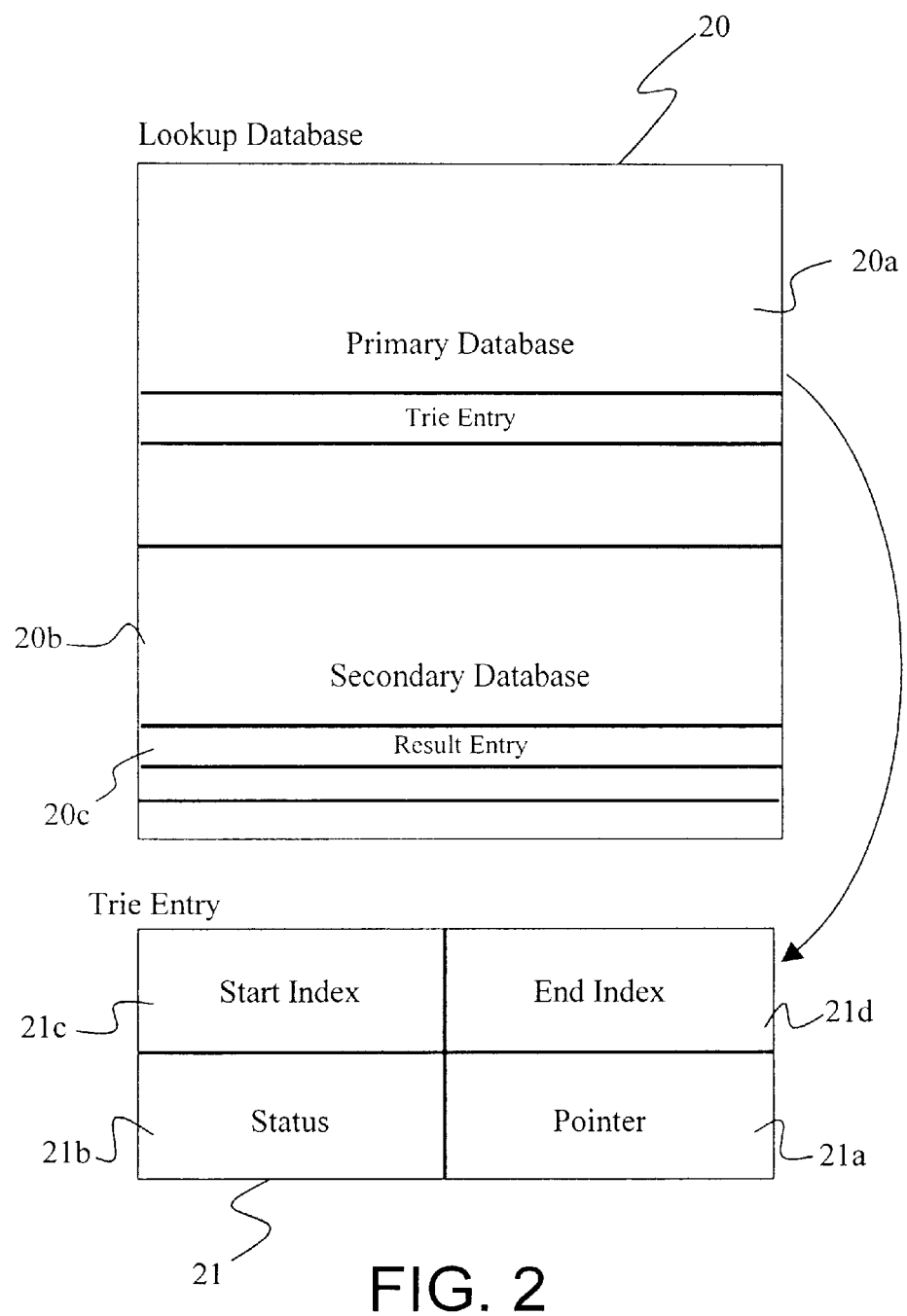
FIG. 2 is a schematic representation of a look-up database and an entry therein.

FIG. 2 shows both a trie look-up database 20 as well as a trie entry 21 characteristic of the present invention.

Although it is not necessary for the present invention, since as will be apparent from the aforementioned publications and elsewhere, a trie search can be organised in a variety of different ways, the present intention preferably has a look-up database functionally partitioned into a primary database 20, containing 'trie entries' 21 and a secondary database 20b, containing 'result entries' 22. This is very largely for convenience.

In known practice a trie entry will normally consist of a pointer 21a, which is a pointer to a block or group of entries of which one will be selected by the next section of the trie key, and a status indication 21b. Shown in FIG. 2 is a trie entry with the 'status' and 'pointer' fields shown. These consist of multibit data fields and may be organised in known manner.

In some forms of trie searching, such as for example described as an example in our earlier British Application number 0004517 9, the entries in the trie database consist either of pointer entries or 'associated data' entries, the latter representing terminations of the search. In the present invention, preferably all the entries in the primary database are pointer entries and the entries in the secondary database yield the 'associated data' and are accessed by means of pointers in the primary database.

FIG. 2 illustrates a preferred form of entry in the primary database according to the invention. The entry 21 includes the conventional fields, the 'status' and 'pointer' fields 21a and 21b but also includes at least one further field or section that defines the next section of the basic trie key which is to be used in the next stage of the trie search. There would be a variety of ways of defining the next section of the trie key. If for example the trie key were divided into predetermined sections, then the search code could merely indicate an identification code, such as number, of the next section to be used. However, such a scheme is rather restrictive and it is preferable to employ a scheme which will define not only the next section to be used but also the size of the next section. Preferably therefore the trie entry as shown in FIG. 2 includes a 'start index' 21c and an 'end index' 21d which define the start and end of the next section in the key and therefore inherently define not only the section of the trie key but also the size of the next section.

Figure 3:
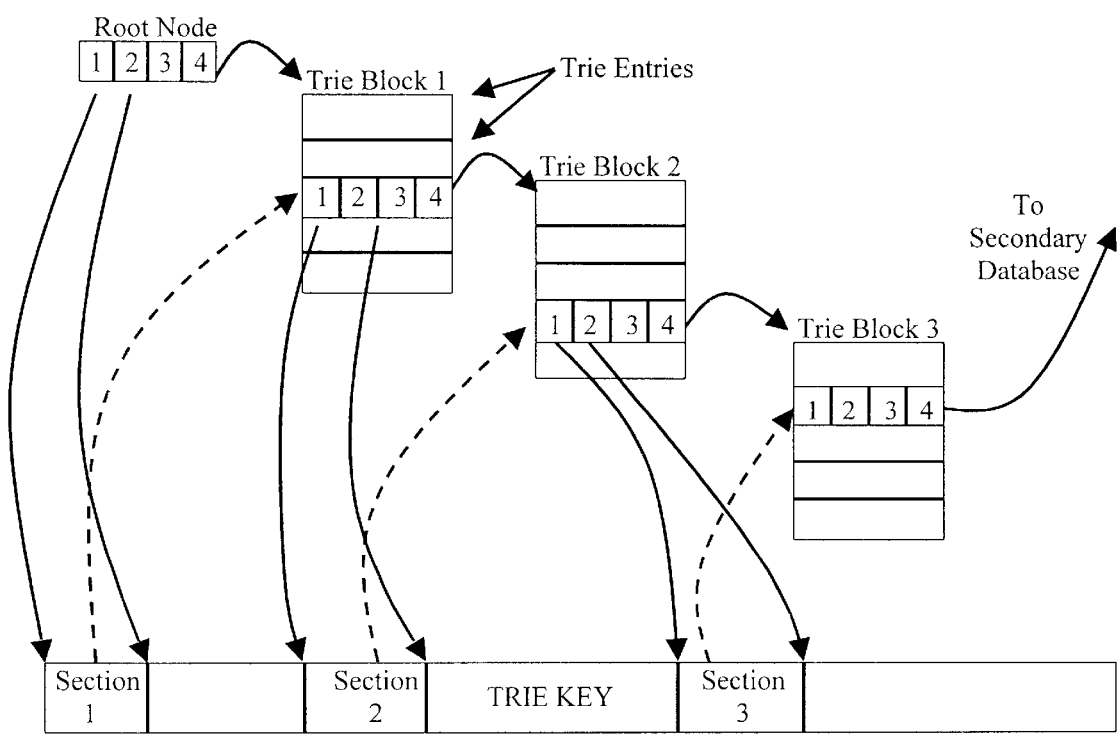
FIG. 3 illustrates an example of a trie search conducted according to the invention.

FIG. 3 represents the operation of a trie search according to the invention. The first access to the primary database is to a root node. This entry in the primary database and each of the other entries shown in FIG. 3 has or includes four fields denoted 1, 2, 3 and 4. Field 1 is the trie key start index, which points to the start of the trie section to be used in the search. Field 2 is the trie key end index which points to the end of the trie section to be used in the search. Field 3 is the search status, indicating whether the pointer will access another trie entry in the primary database or a result entry in the secondary database. Field 4 is a pointer which points either to another trie entry in the primary database or to a result entry, depending on the status of the search. The addressing required at each stage of the search comprises adding a selected part of a search key to the pointer.

The search engine begins the search by accessing the root node. This will indicate which section of the trie key should be accessed first. The selected section is identified by the fields 1 and 2. Moreover, field 4 in the root node will indicate an address to which should be appended the section of the trie to form the address of a trie entry in 'Trie Block 1' Fields 1 and 2 of this entry identify 'section 2' of the trie key, which in this example is not a section adjacent section 1 but is a section taken from some later selection of bits in the trie key. Again, the pointer (4) will determine which of a next block is the access and section 2 will identify which entry in this next block (Trie Block 2) should be accessed.

The accessed entry in Trie Block 2 identifies by its fields 1 and 2 a third section of the trie key, again not contiguous with section 2 or section 1 in the trie key to identify and entry in Trie Block 3 selected by means of field 4 in the entry in Trie Block 2.

In this example it is assumed that status field 3 of the selected entry in Trie Block 3 indicates that pointer 4 should point to an entry in the secondary database, so that the trie search is completed.

The present invention therefore provides the ability to make arbitrary selections of sections, preferably of selectable size, from a basic trie key, the selections being determined by the trie entries themselves. The search mechanism may jump forwards and backwards in the search key as required.

What is claimed is:

1. A method of performing a trie search in a look-up database which includes a multiplicity of entries each of which includes a pointer, the method comprising:
   providing a trie search key;
   performing a plurality of stages of a search, wherein each stage comprises accessing a data entry including a search code and a pointer which points to a block of entries for a next stage of the search; and
   accessing a selected section of said trie search key, said selected section defining a particular entry in said block of entries;
   wherein said accessing step comprises identifying a position of said selected section within said trie search key by means of said search code in said data entry.

2. A method according to claim 1 wherein said search code comprises fields defining the start and finish of the said selected section of the said trie search key for said next stage of the search.

3. A search apparatus comprising:
   a look-up database comprising a multiplicity of entries each of which includes an address pointer and a status indication, wherein said status indication indicates whether said pointer identifies a block of entries in the next stage of the search; and
   means for providing a trie key of which sections each define a particular entry within a block of entries defined by a pointer;
   wherein each of said entries includes a search code which comprises a start index and an end index, wherein said start index indicates the commencement of a selected section of the trie key for said next stage of the search and said end index indicates the end of said selected section.

4. A multi-port network switch comprising:
   a multiplicity of ports for receiving and sending addressed data packets;
   a look-up database; and
   a search engine for performing a trie search in said database to retrieve, in response to a trie search key, forwarding data identifying a port from which an addressed packet is to be forwarded;
   wherein said look-up database has a trie search structure comprising a multiplicity of entries each of which includes an address pointer which identifies a respective group of entries and wherein each of said entries in said multiplicity includes a search code which indicates the length and position of a selected section of said trie search key, said selected section identifying in combination with said address pointer an entry within said respective group of entries.

5. A trie search apparatus comprising:
   a root node;
   a multiplicity of trie blocks including at least a first trie block, a second trie block and a third trie block; and
   a trie search key;
   wherein:
     said root node includes a start index and an end index, said start index and said end index defining a start and a finish of a first section of said trie search key, and a pointer to said first trie block;
     each of said multiplicity of trie blocks includes a multiplicity of entries each including a respective start index, a respective end index and a respective pointer;
     said first section of said trie search key identifies an entry in said first trie block;
     at least one entry in said first block has a respective start index and a respective end index defining a second section of said trie search key and a respective pointer identifying said second trie block;
     said second section of said trie search key identifies an entry in said second trie block;
     at least one entry in said second block has a respective start index and a respective end index defining a third section of said trie search key and a respective pointer identifying said third trie block; and
     said third section of said trie search key identifies an entry in said third trie block.

6. A trie search apparatus comprising:
   a root node;
   a multiplicity of trie blocks including at least a first trie block and a second trie block; and
   a trie search key;
   wherein:
     said root node includes a start index and an end index, said start index and said end index defining a start and a finish of a first section of said trie search key, and a pointer to said first trie block;
     each of said multiplicity of trie blocks includes a multiplicity of entries each including a respective start index, a respective end index and a respective pointer;
     said first section of said trie search key identifies an entry in said first trie block;
     at least one entry in said first block has a respective start index and a respective end index defining a second section of said trie search key and a respective pointer identifying said second trie block;
     said second section of said trie search key identifies an entry in said second trie block;
     at least one entry in said second block has a respective start index and a respective end index defining a third section of said trie search key and a respective pointer identifying said third trie block, said third section of said trie search key not being contiguous with said second section of said trie search key; and
     said third section of said trie search key identifies an entry in said third trie block.

7. A trie search apparatus comprising:
   a root node;
   a multiplicity of trie blocks including at least a first trie block and a second trie block;
   a secondary database containing result entries; and
   a trie search key;
   wherein:

said root node includes a start index and an end index, said start index and said end index defining a start and a finish of a first section of said trie search key, a status indication and a pointer to said first trie block;

each of said multiplicity of trie blocks includes a multiplicity of entries each including a respective start index, a respective end index, a status indication and a respective pointer, said status indication indicating whether the respective pointer identifies another trie block or a result entry in said secondary database;

said first section of said trie search key identifies an entry in said first trie block;

at least one entry in said first block has a respective start index and a respective end index defining a second section of said trie search key and a respective pointer identifying said second trie block;

said second section of said trie search key identifies an entry in said second trie block;

at least one entry in said second block has a respective start index and a respective end index defining a third section of said trie search key and a respective pointer identifying said third trie block; and said third section of said trie search key identifies an entry in said third trie block.

8. A trie search apparatus comprising:

a trie database including a root node and a multiplicity of trie blocks including at least a first trie block, a second trie block and a third trie block;

a secondary database containing result entries; and a trie search key;

wherein:

said root node includes a start index and an end index, said start index and said end index defining a start and a finish of a first section of said trie search key, a status indication and a pointer to said first trie block;

each of said multiplicity of trie blocks includes a multiplicity of entries each including a respective start index, a respective end index, a status indication and a respective pointer, said status indication indicating whether the respective pointer identifies another trie block or a result entry in said secondary database;

said first section of said trie search key identifies an entry in said first trie block;

at least one entry in said first block has a respective start index and a respective end index defining a second section of said trie search key and a respective pointer identifying said second trie block;

said second section of said trie search key identifies an entry in said second trie block;

at least one entry in said second block has a respective start index and a respective end index defining a third section of said trie search key and a respective pointer identifying said third trie block, said third section of said trie search key not being contiguous with said second section of said trie search key; and said third section of said trie search key identifies an entry in said third trie block.

9. A trie search apparatus comprising:

a root node;

a multiplicity of trie blocks including at least a first trie block and a second trie block; and a trie search key;

wherein:

said root node defines a start and a finish of a first section of said trie search key, and points to said first trie block;

each of said multiplicity of the blocks includes a multiplicity of entries each including a respective start index and a respective pointer;

said first section of said trie search key identifies an entry in said first trie block;

at least one entry in said first block has a respective start index, which defines a commencement of a second section of said trie search key, and a respective pointer identifying said second trie block;

said second section of said trie search key identifies an entry in said second trie block;

at least one entry in said second block has a respective start index and a respective end index, which defines the commencement of a third section of said trie search key, and a respective pointer identifying said third trie block; and said third section of said trie search key identifies an entry in said third trie block.

10. A trie search apparatus as in claim 9, wherein said second section of said trie search key is not contiguous with said third section of said trie search key.

11. A trie search apparatus comprising:

a root node;

a multiplicity of trie blocks including at least a first trie block, a second trie block and a third trie block;

a secondary database containing result entries; and a trie search key;

wherein:

said root node defines a start and a finish of a first section of said trie search key, and points to said first trie block;

each of said multiplicity of trie blocks includes a multiplicity of entries each including a respective start index, a status indication and a respective pointer, said status indication indicating whether said respective pointer identifies another trie block or a result entry in said secondary database;

said first section of said trie search key identifies an entry in said first trie block;

at least one entry in said first block has a respective start index which defines a commencement of a second section of said trie search key, and a respective pointer, which identifies said second trie block;

said second section of said trie search key identifies an entry in said second trie block;

at least one entry in said second block has a respective start index, which defines a commencement of a third section of said trie search key, and a respective pointer, which identifies said third trie block; and said third section of said trie search key identifies an entry in said third trie block.

12. A trie search apparatus as in claim 11 wherein said third section of said search key is not contiguous with said second section of said trie search key.

13. A trie search apparatus comprising:

a multiplicity of trie blocks including at least a first trie block, a second trie block and a third trie block; and a trie search key;

wherein:

a first section of said trie search key identifies an entry in said first trie block;

each of said multiplicity of trie blocks includes a multiplicity of entries each including a respective start index, a respective end index and a respective pointer;

at least one entry in said first block has a respective start index and a respective end index defining a second section of said trie search key and a respective pointer identifying said second trie block;

said second section of said trie search key identifies an entry in said second trie block;

at least one entry in said second block has a respective start index and a respective end index defining a third section of said trie search key and a respective pointer identifying said third trie block; and said third section of said trie search key identifies an entry in said third trie block.

14. A trie search apparatus comprising:

a multiplicity of trie blocks including at least a first trie block and a second trie block; and a trie search key;

wherein:
said root node includes a start index and an end index, said start index and said end index defining the start and finish of a first section of said trie search key, and a pointer to said first trie block;

each of said multiplicity of trie blocks includes a multiplicity of entries each including a respective start index, a respective end index and a respective pointer;

a first section of said trie search key identifies an entry in said first trie block;

at least one entry in said first block has a respective start index and a respective end index defining a second section of said trie search key and a respective pointer identifying said second trie block;

said second section of said trie search key identifies an entry in said second trie block;

at least one entry in said second block has a respective start index and a respective end index defining a third section of said trie search key and a respective pointer identifying said third trie block, said third section of said trie search key not being contiguous with said second section of said trie search key; and said third section of said trie search key identifies an entry in said third trie block.

15. A trie search apparatus comprising:

a multiplicity of trie blocks including at least a first trie block and a second trie block;

a secondary database containing result entries; and a trie search key;

wherein:
each of said multiplicity of trie blocks includes a multiplicity of entries each including a respective start index, a respective end index, a status indication and a respective pointer, said status indication indicating whether the respective pointer identifies another trie block or a result entry in said secondary database;

said first section of said trie search key identifies an entry in said first trie block;

at least one entry in said first block has a respective start index and a respective end index defining a second section of said trie search key and a respective pointer identifying said second trie block;

said second section of said trie search key identifies an entry in said second trie block;

at least one entry in said second block has a respective start index and a respective end index defining a third section of said trie search key and a respective pointer identifying said third trie block; and said third section of said trie search key identifies an entry in said third trie block.

16. A trie search apparatus as in claim 15 wherein said third section of said trie search key is not contiguous with said second section of said trie search key.

17. A trie search apparatus comprising:

a multiplicity of trie blocks including at least a first trie block and a second trie block and a trie search key;

wherein:
a first section of said trie search key points to said first trie block;

each of said multiplicity of trie blocks includes a multiplicity of entries each including a respective start index and a respective pointer;

at least one entry in said first block has a respective start index, which defines the commencement of a second section of said trie search key, and a respective pointer identifying said second trie block;

said second section of said trie search key identifies an entry in said second trie block;

at least one entry in said second block has a respective start index and a respective end index, which defines the commencement of a third section of said trie search key, and a respective pointer identifying said third trie block; and said third section of said trie search key identifies an entry in said third trie block.

18. A trie search apparatus as in claim 17 wherein said second section of said trie search key is not contiguous with said third section of said trie search key.

19. A trie search apparatus comprising:

a multiplicity of trie blocks including at least a first trie block, a second trie block and a third trie block;

a secondary database containing result entries; and a trie search key;

wherein:
each of said multiplicity of trie blocks includes a multiplicity of entries each including a respective start index, a status indication and a respective pointer, said status indication indicating whether said respective pointer identifies another trie block or a result entry in said secondary database;

a first section of said trie search key identifies an entry in said first trie block;

at least one entry in said first block has a respective start index which defines a commencement of a second section of said trie search key, and a respective pointer, which identifies said second trie block;

said second section of said trie search key identifies an entry in said second trie block;

at least one entry in said second block has a respective start index, which defines a commencement of a third section of said trie search key, and a respective pointer, which identifies said third trie block; and said third section of said trie search key identifies an entry in said third trie block.

20. A trie search apparatus as in claim 19 wherein said second section of said search key is not contiguous with said first section of said trie search key.

21. A trie search apparatus as in claim 20 wherein said second section of said search key is not contiguous with said third section of said trie search key.

* * * * *